United States Patent
Okuno et al.

(10) Patent No.: US 11,192,975 B2
(45) Date of Patent: Dec. 7, 2021

(54) CROSSLINKED RUBBER

(71) Applicant: ZEON CORPORATION, Tokyo (JP)

(72) Inventors: Shingo Okuno, Tokyo (JP); Yasuo Tsunogae, Tokyo (JP)

(73) Assignee: ZEON CORPORATION, Tokyo (JP)

(*) Notice: Subject to any disclaimer, the term of this patent is extended or adjusted under 35 U.S.C. 154(b) by 10 days.

(21) Appl. No.: 16/322,918

(22) PCT Filed: Aug. 16, 2017

(86) PCT No.: PCT/JP2017/029472
§ 371 (c)(1),
(2) Date: Feb. 1, 2019

(87) PCT Pub. No.: WO2018/034310
PCT Pub. Date: Feb. 22, 2018

(65) Prior Publication Data
US 2019/0169360 A1    Jun. 6, 2019

(30) Foreign Application Priority Data
Aug. 17, 2016 (JP) .............................. JP2016-159914

(51) Int. Cl.
C08G 61/08 (2006.01)
C08K 3/04 (2006.01)
C08J 3/24 (2006.01)
C08L 65/00 (2006.01)
B60C 1/00 (2006.01)

(52) U.S. Cl.
CPC ............... *C08G 61/08* (2013.01); *C08J 3/24* (2013.01); *C08K 3/04* (2013.01); *C08L 65/00* (2013.01); *B60C 1/00* (2013.01); *C08G 2261/12* (2013.01); *C08G 2261/1644* (2013.01); *C08G 2261/3321* (2013.01); *C08G 2261/76* (2013.01); *C08G 2380/00* (2013.01)

(58) Field of Classification Search
CPC .................................. C08G 61/08; C08K 3/04
USPC ....................................................... 524/553
See application file for complete search history.

(56) References Cited

U.S. PATENT DOCUMENTS

| | | | |
|---|---|---|---|
| 3,778,385 A | 12/1973 | Zuech | |
| 2012/0289646 A1* | 11/2012 | Tsunogae | C08K 3/04 524/525 |
| 2012/0296035 A1* | 11/2012 | Tsunogae | C08G 61/08 524/576 |
| 2013/0281615 A1* | 10/2013 | Tsunogae | C08G 61/08 524/588 |
| 2016/0002382 A1 | 1/2016 | Tsunogae et al. | |
| 2017/0129990 A1 | 5/2017 | Tsunogae et al. | |
| 2017/0233560 A1 | 8/2017 | Kuramoto et al. | |
| 2017/0247479 A1* | 8/2017 | Kuramoto | C08G 61/08 |

FOREIGN PATENT DOCUMENTS

| | | |
|---|---|---|
| EP | 2 963 074 A1 | 1/2016 |
| JP | S50-018040 B1 | 6/1975 |
| JP | 2010-116458 A | 5/2010 |
| JP | 2016-079329 A | 5/2016 |
| JP | 2016-079330 A | 5/2016 |
| JP | 2017-119751 A | 7/2017 |
| JP | 2017-119752 A | 7/2017 |
| WO | 2011/087071 A1 | 7/2011 |
| WO | 2011/087072 A1 | 7/2011 |
| WO | 2015/194637 A1 | 12/2015 |
| WO | 2016/060262 A1 | 4/2016 |
| WO | 2016/060267 A1 | 4/2016 |
| WO | WO2016/060267 * | 4/2016 |
| WO | WO-2016060267 A1 * | 4/2016 ............. C08C 19/00 |

OTHER PUBLICATIONS

Shamsul Bin Kamaruddin, "Long-term Mechanical Properties of Rubber," University of Southhampton, Published Oct. 2013, pp. 71-74.*
Database WPI, Week 201037, XP-002797424, Thomson Scientific, London, GB.
Feb. 17, 2020 Extended Search Report issued in European Patent Application No. 17841532.9.
Oct. 3, 2017 International Search Report issued in International Patent Application No. PCT/JP2017/029472.
Feb. 19, 2019 International Preliminary Report on Patentability issued in International Patent Application No. PCT/JP2017/029472.

* cited by examiner

Primary Examiner — Deve V Hall
(74) Attorney, Agent, or Firm — Oliff PLC

(57) ABSTRACT

A crosslinked rubber is produced by crosslinking a polymer composition containing 100 parts by weight of a rubber component containing a cyclopentene ring-opening polymer and 20 to 200 parts by weight of carbon black, wherein, when the crosslinked rubber is subjected to an ozone treatment in which the rubber is maintained at 40° C. and an ozone concentration of 50 pphm for 144 hours under a 20% tensile strain, the crosslinked rubber shows a rate of change in tensile strength before and after ozone treatment of within ±70%.

3 Claims, No Drawings

CROSSLINKED RUBBER

TECHNICAL FIELD

The present invention relates to a crosslinked rubber obtained by using a cyclopentene ring-opening polymer and more specifically, relates to a crosslinked rubber having excellent ozone resistance obtained by using a cyclopentene ring-opening polymer.

BACKGROUND ART

Conventionally, butadiene rubber has been widely used for forming various rubber parts. Butadiene, the raw material of butadiene rubber, is produced as a by-product in producing ethylene by means of naphtha cracking. In recent years, as methods for producing ethylene, those in which natural gas such as ethane is used as the raw material are spreading, a reduction in the production of butadiene is predicted. Thus, use of synthetic rubbers not including butadiene as the raw material as an alternative material for butadiene rubber has been investigated in various ways.

One example of synthetic rubbers that have been investigated as alternative materials for butadiene rubber is a cyclopentene ring-opening polymer, which can be obtained by ring-opening polymerizing cyclopentene. For example, Patent Document 1 discloses a rubber composition for tires that contains a cyclopentene ring-opening polymer, a solution-polymerized styrene-butadiene rubber, and silica. Although a crosslinked rubber having the excellent low heat generation property can be provided in accordance with the technique of Patent Document 1, the ozone resistance thereof has not been necessarily sufficient. Thus, the rubber is suitable for tire applications in which a low heat generation property is required, but is not necessarily suitable for applications in which ozone resistance is required.

RELATED ART

Patent Documents

Patent Document 1: International Publication No. WO 2016/060267

SUMMARY OF THE INVENTION

Problem to be Solved by the Invention

The present invention has been made in view of such circumstances, and it is an object of the present invention to provide a crosslinked rubber having excellent ozone resistance obtained by using a cyclopentene ring-opening polymer.

Means for Solving the Problem

As a result of intensive studies to achieve the object described above, the present inventors have found that the object described above can be achieved by a crosslinked rubber that is produced by crosslinking a polymer composition including a rubber component that contains a cyclopentene ring-opening polymer and a predetermined amount of carbon black, the crosslinked rubber, when subjected to an ozone treatment under specific conditions, having a rate of change in tensile strength before and after ozone treatment controlled within a specific range, and thus have completed the present invention.

Specifically, according to the present invention, there is provided a crosslinked rubber produced by crosslinking a polymer composition containing 100 parts by weight of a rubber component containing a cyclopentene ring-opening polymer and 20 to 200 parts by weight of carbon black, wherein, when the crosslinked rubber is subjected to an ozone treatment in which the rubber is maintained at 40° C. and an ozone concentration of 50 pphm for 144 hours under a 20% tensile strain, the crosslinked rubber shows a rate of change in tensile strength before and after ozone treatment of within ±70%.

Preferably, the proportion of a repeat unit formed by ring-opening polymerizing cyclopentene in the cyclopentene ring-opening polymer is 80 mol % or more with respect to the total repeat units.

Preferably, the content of the cyclopentene ring-opening polymer in the rubber component is 50% by weight or more with respect to 100% by weight of the total rubber component.

Preferably, the cyclopentene ring-opening polymer has a modifying group containing an atom selected from the group consisting of atoms in Group XV of the Periodic Table, atoms in Group XVI of the Periodic Table, and a silicon atom.

Preferably, the modifying group is an oxysilyl group.

Preferably, the cyclopentene ring-opening polymer has the modifying group at an end of its polymer chain.

Preferably, the carbon black is furnace black.

Effects of Invention

According to the present invention, it is possible to provide a crosslinked rubber obtained by using a cyclopentene ring-opening polymer, the crosslinked rubber having excellent ozone resistance and thus being suitably used in applications in which ozone resistance is required.

DESCRIPTION OF EMBODIMENTS

The crosslinked rubber of the present invention is a crosslinked rubber produced by crosslinking a polymer composition containing 100 parts by weight of a rubber component containing a cyclopentene ring-opening polymer and 20 to 200 parts by weight of carbon black, wherein, when the crosslinked rubber is subjected to an ozone treatment in which the composition is maintained at 40° C. and an ozone concentration of 50 pphm for 144 hours under a 20% tensile strain, the crosslinked rubber shows a rate of change in tensile strength before and after ozone treatment of within ±70%.

The rubber component to be used in the present invention contains a cyclopentene ring-opening polymer. The cyclopentene ring-opening polymer to be used in the present invention is a polymer containing a repeat unit formed by ring-opening polymerizing cyclopentene, as a repeat unit that constitute the main chain of the polymer.

The cyclopentene ring-opening polymer has the proportion of the repeat units formed by ring-opening polymerizing cyclopenetene of preferably 80 mol % or more, more preferably 90 mol % or more, still more preferably 95 mol % or more, with respect to the total repeat units. It is particularly preferred that the cyclopentene ring-opening polymer substantially consist only of the repeat unit formed by ring-opening polymerizing cyclopentene. However, as long as the properties of the cyclopentene ring-opening polymer are maintained, the polymer may contain repeat units derived from other monomers copolymerizable with cyclopentene. The proportion of the repeat units derived from other monomers is preferably 20 mol % or less, more preferably 10 mol % or less, still more preferably 5 mol % or less, with respect to the total repeat units. Examples of the other monomers copolymerizable with cyclopentene include monocycloolefins other than cyclopentene, monocyclodienes, monocyclotrienes, polycyclic cycloolefins, polycyclic cyclodienes, polycyclic cyclotrienes, and the like. Examples of the monocyclic olefins other than cyclopentene include cyclopentenes having a substituent and cyclooctene that may have a substituent. Examples of the monocyclodienes include 1,5-cyclooctadiene that may have a substituent. Examples of the monocyclic trienes include 1,5,9-cyclododecatriene that may have a substituent. Examples of the polycyclic cycloolefins, polycyclic cyclodienes, and polycyclic cyclotrienes include norbornene compounds that may have a substituent, such as 2-norbornene, dicyclopentadiene, 1,4-methano-1,4,4a,9a-tetrahydro-9H-fluorene, and tetracyclo[6.2.1.1$^{3,6}$.0$^{2,7}$]dodeca-4-ene.

The molecular weight of the cyclopentene ring-opening polymer is preferably, but not particularly limited to, 100,000 to 1,000,000, preferably 150,000 to 900,000, more preferably 200,000 to 800,000, as the value of the weight average molecular weight in tams of polystyrene (Mw), measured by gel permeation chromatography. When the cyclopentene ring-opening polymer has such a molecular weight, it is possible to make the mechanical physical properties of the crosslinked rubber more excellent.

The ratio of the weight average molecular weight (Mw) to the number average molecular weight (Mn) of the cyclopentene ring-opening polymer (Mw/Mn), in terms of polystyrene, measured by gel permeation chromatography is usually, but not particularly limited to, 4.0 or less, preferably 3.5 or less, more preferably 3.0 or less. When the cyclopentene ring-opening polymer has such Mw/Mn, it is possible to make the mechanical physical properties of the crosslinked rubber more excellent.

The cis/trans ratio of the double bonds existing in repeat units constituting the cyclopentene ring-opening polymer is usually, but not particularly limited to, set within the range of 10/90 to 90/10. In view of allowing the crosslinked rubber to have more excellent low-temperature properties, the cis/trans ratio is preferably in the range of 51/49 to 90/10, more preferably in the range of 55/45 to 90/10. In view of allowing the crosslinked rubber to have more excellent breaking strength properties, the cis/trans ratio is preferably in the range of 10/90 to 49/51, more preferably in the range of 10/90 to 45/55.

Examples of a method for adjusting the cis/trans ratio of the cyclopentene ring-opening polymer include, but not particularly limited to, a method involving controlling polymerization conditions when cyclopentene is polymerized to obtain a cyclopentene ring-opening polymer, and the like. By way of an example, the higher the polymerization temperature in polymerizing cyclopentene is, the higher the proportion of trans bond can be. Also, the lower the monomer concentration in the polymerization solution is, the higher the proportion of trans bond can be.

The glass transition temperature of the cyclopentene ring-opening polymer is preferably, but not particularly limited to, −90° C. or less, more preferably −95° C. or less, still more preferably −98° C. or less, in view of making the polymer exhibit excellent properties at low temperatures. The glass transition temperature of the cyclopentene ring-opening polymer can be adjusted by adjusting, for example, the cis/trans ratio of the double bonds existing in the repeat units.

The cyclopentene ring-opening polymer may have a molecular structure consisting only of carbon atoms and hydrogen atoms. Alternatively, the cyclopentene ring-opening polymer may contain atoms other than carbon atoms and hydrogen atoms in its molecular structure, in view of enabling the polymer to have more excellent ozone resistance. More specifically, the polymer may contain a modifying group containing an atom selected from the group consisting of atoms in Group XV of the Periodic Table, atoms in Group XVI of the Periodic Table, and a silicon atom.

As such a modifying group, a modifying group containing an atom selected from the group consisting of a nitrogen atom, oxygen atom, phosphorous atom, sulfur atom, and silicon atom is suitable. Of these, a modifying group containing an atom selected from the group consisting of a nitrogen atom, oxygen atom, and silicon atom is more suitable, and a modifying group containing a silicon atom is still more suitable.

Examples of the modifying group containing a nitrogen atom include an amino group, pyridyl group, imino group, amide group, nitro group, urethane bond group, and hydrocarbon groups containing any of these groups. Examples of the modifying group containing an oxygen atom include a hydroxyl group, carboxylic group, ether group, ester group, carbonyl group, aldehyde group, epoxy group, and hydrocarbon groups containing any of these groups. Examples of the modifying group containing a silicon atom include an alkylsilyl group, oxysilyl group, or hydrocarbon groups containing these groups. Examples of the modifying group containing a phosphorous atom include a phosphate group, phosphino group, and hydrocarbon groups containing any of these groups. Examples of the modifying group containing a sulfur group include a sulfonyl group, thiol group, thioether group, and hydrocarbon groups containing any of these groups. The modifying group may be a modifying group containing a plurality of the groups described above. Of these, in view of enabling the polymer to have more excellent ozone resistance, specific examples of a particularly preferable modifying group include an amino group, pyridyl group, imino group, amide group, hydroxyl group, carboxylic group, aldehyde group, epoxy group, oxysilyl group, and hydrocarbon groups containing any of these groups, and an oxysilyl group is particularly preferable. Herein, the oxysilyl group refers to a group having a silicon-oxygen bond.

Specific examples of the oxysilyl group include an alkoxysilyl group, aryloxysilyl group, acyloxy group, alkylsiloxysilyl group, arylsiloxysilyl group, hydroxysilyl group, and the like. Of these, in view of its high introduction effect, an alkoxysilyl group is preferable.

An alkoxysilyl group is a group formed by binding one or more alkoxy groups to a silicon atom, and specific examples thereof include a trimethoxysilyl group, a (dimethoxy)(methyl)silyl group, (methoxy) (dimethyl)silyl group, triethoxysilyl group, (diethoxy) (nethyl)silyl group, (ethoxy)(dimethyl)silyl group, (dimethoxy) (ethoxy)silyl group, (methoxy) (diethoxy)silyl group, tripropoxysilyl group, tributoxysilyl group, and the like.

An aryloxysilyl group is a group formed by binding one or more aryloxy group to a silicon atom, and specific examples thereof include a triphenoxysilyl group, (diphenoxy) (methyl)silyl group, (phenoxy) (dimethyl)silyl group, (diphenoxy) (ethoxy)silyl group, (phenoxy) (diethoxy)silyl group, and the like. Of these, the (diphenoxy) (ethoxy) silyl group and (phenoxy) (diethoxy) silyl group may be classified also into alkoxysilyl groups because of having an alkoxy group in addition to an aryloxy group.

An acyloxysilyl group is a group formed by binding one or more acyloxy groups to a silicon atom, and examples thereof include a triacyloxysilyl group, (diacyloxy)(methyl)silyl group, (acyloxy)(dimethyl)silyl group, and the like.

An alkylsiloxysilyl group is a group formed by binding one or more alkylsiloxy groups to a silicon atom, and specific examples thereof include a tris(trimethylsiloxy)silyl group, trimethylsiloxy(dimethyl)silyl group, triethylsiloxy(diethyl)silyl group, tris(dimethylsiloxy)silyl group, and the like.

An arylsiloxysilyl group is a group formed by binding one or more arylsiloxy groups to a silicon atom, and specific examples thereof include a tris(phenylsiloxy)silyl group, triphenylsiloxy(dimethyl)silyl group, tris(diphenylsiloxy)silyl group, and the like.

A hydroxysilyl group is a group formed by binding one or more hydroxy groups to a silicon atom, and specific examples thereof include a trihydroxysilyl group, (dihydroxy)(methyl)silyl group, (hydroxy)(dimethyl)silyl group, (dihydroxy)(ethoxy)silyl group, (hydroxy)(diethoxy)silyl group, and the like. Of these, the (dihydroxy)(ethoxy)silyl group and (hydroxy)(diethoxy)silyl group may be classified also into alkoxysilyl groups because of having an alkoxy group in addition to a hydroxy group.

When the cyclopentene ring-opening polymer have such a modifying group, the position at which the modifying group is introduced is not particularly limited, but, in view of enhancing the introduction effect, the polymer preferably has a modifying group at an end(s) of polymer chains.

When the cyclopentene ring-opening polymer has a modifying group at an end(s) of the polymer chains, the polymer chains may have the modifying group introduced at one end of the polymer chains (single end) or at each of both ends of the polymer chains (both ends), or these polymer chains may be mixed. Any of these polymers and an unmodified cyclopentene ring-opening polymer into which a specific modifying group is not introduced at an end(s) of the polymer chains may be mixed.

When the cyclopentene ring-opening polymer has a modifying group at an end(s) of the polymer chains, the proportion of the modifying group introduced at the polymer chain end(s) of the cyclopentene ring-opening polymer is preferably, but not particularly limited to, 60% or more, more preferably 80% or more, still more preferably 100% or more, in terms of a percentage value of the number of cyclopentene ring-opening polymer chain ends at which the modifying group is introduced/the number of cyclopentene ring-opening polymer chains. As the proportion of the modifying group introduced is higher, the ozone resistance can be more improved. Methods for measuring the proportion of the modifying group introduced at polymer chain ends are not particularly limited. For example, the proportion can be determined from the peak area ratio corresponding to the modifying groups obtained by $^1$H-NMR spectrum measurement and the number average molecular weight obtained by gel permeation chromatography.

Methods for synthesizing the cyclopentene ring-opening polymer are not particularly limited as long as the intended polymer can be obtained. The polymer may be synthesized by a conventional method, and for example, can be synthesized in accordance with a method described below.

Specifically, the cyclopentene ring-opening polymer can be obtained by ring-opening polymerizing cyclopentene in the presence of a polymerization catalyst containing a transition metal compound (A) of Group VI of the Periodic Table and an organoaluminum compound (B) represented by the following general formula (1):

$$(R^1)_{3-x}Al(OR^2)_x \qquad (1)$$

wherein each of $R^1$ and $R^2$ represents a hydrocarbon group having 1 to 20 carbon atoms, and x is $0<x<3$.

The transition metal compound (A) of Group VI of the Periodic Table is a compound having a transition metal atom of Group VI of the Periodic Table (Long-Period Periodic Table, the same applies to the following), specifically, a compound having a chromium atom, molybdenum atom, or tungsten atom, preferably a compound having a molybdenum atom, or a compound having a tungsten atom, in particular, more preferably a compound having a tungsten atom in view of having a high solubility in cyclopentene. The transition metal compound (A) of Group VI of the Periodic Table may be a compound having any transition metal atom of Group VI of the Periodic Table, and examples thereof include, but not particularly limited to, halides, alcoholates, arylates, oxylates, and the like of any transition metal atom of Group VI of the Periodic Table. Of these, halides are preferable in view of a high polymerization activity.

Specific examples of such a transition metal compound (A) of Group VI of the Periodic Table include molybdenum compounds such as molybdenum pentachloride, molybdenum oxotetrachloride, and molybdenum(phenylimide)tetrachloride; tungsten compounds such as tungsten hexachloride, tungsten oxotetrachloride, tungsten (phenylimide) tetrachloride, monocatecholate tungsten tetrachloride, bis(3,5-di-tert-butyl)catecholate tungsten dichloride, bis(2-chloroetherate)tetrachloride, and tungsten oxotetraphenolate; and the like.

The amount of transition metal compound (A) of Group VI of the Periodic Table to be used is usually in the range of 1:100 to 1:200,000, preferably in the range of 1:200 to 1:150,000, more preferably in the range of 1:500 to 1:100,000, in terms of the molar ratio of "transition metal atom of Group VI in the polymerization catalyst:cyclopentene". If the amount of the transition metal compound (A) of Group VI of the Periodic Table to be used is excessively small, the polymerization reaction may not sufficiently proceed. In contrast, if the amount is excessively large, it may be difficult to remove the catalyst residue from the cyclopentene ring-opening polymer and thus various properties of the crosslinked rubber to be obtained may be degraded.

The organoaluminum compound (B) is the compound represented by the above general formula (1). Specific examples of the hydrocarbon groups having 1 to 20 carbon atoms represented by $R^1$ and $R^2$ in the general formula (1) include alkyl groups such as a methyl group, ethyl group, isopropyl group, n-propyl group, isobutyl group, n-butyl group, t-butyl group, n-hexyl group, and cyclohexyl group; aryl groups such as a phenyl group, 4-methylphenyl group, 2,6-dimethylphenyl group, 2,6-diisopropylphenyl group, and naphthyl group; and the like. The groups represented by $R^1$ and $R^2$ in the compound represented by the general formula (1) may be the same or may be different, but in view of controlling the proportion of cis bond in the cyclopentene ring-opening polymer to be obtained within the suitable range described above, at least $R^2$ of $R^1$ and $R^2$ is preferably an alkyl group having 4 or more carbon atoms consecutively bonded together, particularly more preferably a n-butyl group, 2-methyl-pentyl group, n-hexyl group, cyclohexyl group, n-octyl group, or n-decyl group.

In the above general formula (1), x is $0<x<3$. That is, in the general formula (1), the compositional ratio of $R^1$ and OR² can be any value in each range of 0<3-x<3 and 0<x<3, respectively. x is preferably 0.5<x<1.5 in view of the high polymerization activity and also in view of controlling the proportion of cis bond in the cyclopentene ring-opening polymer within the suitable range described above.

The organoaluminum compound (B) represented by the above general formula (1) can be synthesized by, for example, a reaction of trialkyl aluminum and alcohol as shown in the following general formula (2):

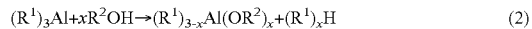

$(R^1)_3Al + xR^2OH \rightarrow (R^1)_{3-x}Al(OR^2)_x + (R^1)_xH$ (2)

x in the above general formula (1) can be arbitrarily controlled by defining the reaction ratio of the corresponding trialkyl aluminum and alcohol as shown in the above general formula (2).

The amount of the organoaluminum compound (B) to be used is preferably 0.1 to 100 times by mole, more preferably 0.2 to 50 times by mole, still more preferably 0.5 to 20 times by mole, with respect to the transition metal atom of Group VI of the Periodic Table forming the transition metal compound (A) of Group VI of the Periodic Table, depending on the type of the organoaluminum compound (B) used. If the amount of the organoaluminum compound (B) to be used is excessively small, the polymerization activity may be insufficient, and if the amount is excessively large, a side reaction tends to occur during ring-opening polymerization.

The ring-opening polymerization reaction may be performed without a solvent or in a solution. Solvents to be used when the ring-opening polymerization reaction is pertained in a solution are not particularly limited as long as the solvents are inert in the polymerization reaction and can dissolve cyclopentene and the polymerization catalyst described above that are used in the ring-opening polymerization. Examples of the solvents include hydrocarbon-based solvents or halogen-based solvents, and the like. Specific examples of the hydrocarbon-based solvents include aromatic hydrocarbon such as benzene, toluene, xylene, and ethylbenzene; aliphatic hydrocarbon such as n-hexane, n-heptane, and n-octane; alicyclic hydrocarbon such as cyclohexane, cyclopentane, and methylcyclohexane; and the like. Specific examples of the halogen-based solvents include alkyl halogens such as dichloromethane and chloroform; aromatic halogens such as chlorobenzene and dichlorobenzene; and the like.

When a modifying group-containing olefinically unsaturated hydrocarbon (C), which is a compound having the modifying group mentioned above and having one olefinic carbon-carbon double bond having metathesis reactivity, is placed in the polymerization reaction system of the ring-opening polymerization reaction, it is possible to introduce the modifying group to a polymer chain end of the cyclopentene ring-opening polymer. For example, when an oxysilyl group is introduced to a polymer chain end of the cyclopentene ring-opening polymer, an oxysilyl group-containing olefinically unsaturated hydrocarbon may be placed in the polymerization reaction system.

Examples of such an oxysilyl group-containing olefinically unsaturated hydrocarbon include, as a hydrocarbon used for introducing the modifying group to only one end of the polymer chain (single end) of the cyclopentene ring-opening polymer, alkoxysilane compounds such as vinyl (trimethoxy) silane, vinyl (triethoxy) silane, allyl (trimethoxy) silane, allyl (dimethyl) silane, allyl (triethoxy) silane, allyl (ethoxy) (dimethyl) silane, styryl (trimethoxy) silane, styryl (triethoxy) silane, 2-styrylethyl (triethoxy) silane, allyl(triethoxysilylmethyl)ether, and allyl(triethoxysilylmethyl) (ethyl)amine; aryloxysilane compounds such as vinyl (triphenoxy) silane, allyl (triphenoxy) silane, and allyl(phenoxy) (dimethyl)silane; acyloxysilane compounds such as vinyl (triacetoxy) silane, allyl (triacetoxy) silane, allyl(diacetoxy)methylsilane, and allyl(acetoxy) (dimethyl) silane; alkylsiloxysilane compounds such as allyltris(trimethylsiloxy)silane; arylsiloxysilane compounds such as allyltris(triphenylsiloxy)silane; polysiloxane compounds such as 1-allylheptamethyltrisiloxane, 1-allylnonamethyltetrasiloxane, 1-allylnonamethylcyclopentasiloxane, and 1-allylundecamethylcyclohexasiloxane; and the like. Examples thereof also include, as a hydrocarbon used for introducing the modifying groups to both polymer chain ends (both ends) of the cyclopentene ring-opening polymer, alkoxysilane compounds such as 1,4-bis(trimethoxysilyl)-2-butene, 1,4-bis(triethoxysilyl)-2-butene, and 1,4-bis(trimethoxysilylmethoxy)-2-butene; aryloxysilane compounds such as 1,4-bis(triphenoxysilyl)-2-butene; acyloxysilane compounds such as 1,4-bis(triacetoxysilyl)-2-butene; alkylsiloxysilane compounds such as 1,4-bis[tris(trimethylsiloxy)silyl]-2-butene; arylsiloxysilane compounds such as 1,4-bis[tris(triphenylsiloxy)silyl]-2-butene; polysiloxane compound such as 1,4-bis(heptamethyltrisiloxy)-2-butene, and 1,4-bis(undecamethylcyclohexasiloxy)-2-butene; and the like.

The amount of the modifying group-containing olefinically unsaturated hydrocarbon (C) such as the oxysilyl group-containing olefinically unsaturated hydrocarbon to be used may be appropriately selected depending on the molecular weight of the cyclopentene ring-opening polymer to be produced, but the molar ratio thereof to cyclopentene in use for polymerization is usually in the range of 1/100 to 1/100,000, preferably in the range of 1/200 to 1/50,000, more preferably in the range of 1/500 to 1/10,000. The modifying group-containing olefinically unsaturated hydrocarbon (C) not only serves to introduce the modifying group to a polymer chain end of the cyclopentene ring-opening polymer, but also acts as a molecular weight adjuster.

Alternatively, when the modifying group mentioned above is not introduced to the cyclopentene ring-opening polymer, in order to adjust the molecular weight of the cyclopentene ring-opening polymer to be obtained, an olefin compound such as 1-butene, 1-pentene, 1-hexene, and 1-octene or a diolefin compound such as 1,4-pentadiene, 1,4-hexadiene, 1,5-hexadiene, 1,6-heptadiene, 2-methyl-1,4-pentadiene, and 2,5-dimethyl-1,5-hexadiene, as a molecular weight adjuster, may be used to be added to the polymerization reaction system. The amount of the molecular weight adjuster to be used may be appropriately selected in the same range as that of the modifying group-containing olefinically unsaturated hydrocarbon (C) mentioned above.

The polymerization reaction temperature is, but not particularly limited to, preferably −100° C. or more, more preferably −50° C. or more, still more preferably −20° C. or more, particularly preferably 0° C. or more. The upper limit of the polymerization reaction temperature is, but not particularly limited to, preferably less than 100° C., more preferably less than 90° C., still more preferably less than 80° C., particularly preferably less than 70° C. The polymerization reaction time is also not particularly limited, but is preferably 1 minute to 72 hours, more preferably 10 minutes to 20 hours.

Alternatively, instead of the method including use of the polymerization catalyst including the transition metal compound (A) of Group VI of the Periodic Table and the organoaluminum compound (B) represented by the general formula (1) mentioned above, it is also possible to produce a cyclopentene ring-opening polymer by ring-opening polymerizing cyclopentene in the presence of the ruthenium-carbene complex used as the polymerization catalyst.

The ruthenium-carbene complex is not particularly limited as long as the complex serves as a ring-opening polymerization catalyst for cyclopentene. Specific examples of the ruthenium-carbene complex preferably used may include bis(tricyclohexylphosphine)benzylidene ruthenium dichloride, bis(triphenylphosphine)-3,3-diphenylpropenylidene ruthenium dichloride, (3-phenyl-1H-inden-1-ylidene)bis(tricyclohexylphosphine)ruthenium dichloride, bis(tricyclohexylphosphine)t-butylvinylidene ruthenium dichloride, bis(1,3-diisopropylimidazolin-2-ylidene)benzylidene ruthenium dichloride, bis(1,3-dicyclohexylimidazolin-2-ylidene)benzylidene ruthenium dichloride, (1,3-dimesitylimidazolin-2-ylidene) (tricyclohexylphosphine)benzylidene ruthenium dichloride, (1,3-dimesitylimidazolidin-2-ylidene) (tricyclohexylphosphine)benzylidene ruthenium dichloride, bis(tricyclohexylphosphine)ethoxymethylidene ruthenium dichloride, (1,3-dimesitylimidazolidin-2-ylidene) (tricyclohexylphosphine)ethoxymethylidene ruthenium dichloride, and the like.

As for the amount of the ruthenium-carbene complex to be used, the molar ratio of (metal ruthenium in the catalyst: cyclopentene) is usually in the range of 1:2,000 to 1:2,000,000, preferably in the range of 1:5,000 to 1:1,500,000, more preferably in the range of 1:10,000 to 1:1,000,000. When the amount of the ruthenium-carbene complex to be used is excessively small, the polymerization reaction may not sufficiently proceed. In contrast, if the amount is excessively large, it may be difficult to remove the catalyst residue from the cyclopentene ring-opening polymer to be obtained, and thus various properties of the crosslinked rubber to be obtained may be degraded when the crosslinked rubber is produced.

The ring-opening polymerization reaction in the case where the ruthenium-carbene complex is used as the polymerization catalyst may be performed without a solvent or in a solution. As the solvent to be used when the ring-opening polymerization reaction is performed in a solution, it is possible to use a solvent similar to the one in the case where the polymerization catalyst containing the transition metal compound (A) of Group VI of the Periodic Table and the organoaluminum compound (B) represented by the general formula (1) mentioned above is used.

The polymerization reaction temperature and the polymerization reaction time are also similar to the those in the case where the polymerization catalyst containing the transition metal compound (A) of Group VI of the Periodic Table and the organoaluminum compound (B) represented by the general formula (1) mentioned above is used.

To the cyclopentene ring-opening polymer obtained by the method in which the polymerization catalyst containing the transition metal compound (A) of Group VI of the Periodic Table and the organoaluminum compound (B) represented by the general formula (1) described above or by the method in which the ruthenium-carbene complex is used as the polymerization catalyst, an antiaging agent such as a phenol-based stabilizer, phosphorus-based stabilizer, and sulfur-based stabilizer may be added as desired. The amount of the antiaging agent may be appropriately determined depending on the type thereof and the like. Furthermore, an extender oil may also be compounded therein, as desired. When the cyclopentene ring-opening polymer is obtained as a polymerization solution, a known collection method may be employed in order to collect the polymer from the polymerization solution. For example, a method including separating the solvent by steam stripping or the like, filtering the solid off, and then drying the solid to obtain a solid rubber, and the like may be employed.

The rubber component to be used in the present invention may contain other rubbers in addition to the cyclopentene ring-opening polymer. Examples of the rubbers other than the cyclopentene ring-opening polymer include natural rubber (NR), polyisoprene rubber (IR), solution-polymerized SBR (solution-polymerized styrene-butadiene rubber), emulsion-polymerized SBR (emulsion-polymerized styrene-butadiene rubber), low-cis BR (polybutadiene rubber), high-cis BR, high-trans BR (the trans-bond content in the butadiene moiety: 70 to 95%), styrene-isoprene copolymer rubber, butadiene-isoprene copolymer rubber, ethylene-propylene-diene rubber (EPDM), emulsion-polymerized styrene-acrylonitrile-butadiene copolymer rubber, acrylonitrile-butadiene copolymer rubber, polyisoprene-SBR block copolymer rubber, polystyrene-polybutadiene-polystyrene block copolymer, acrylic rubber, epichlorohydrin rubber, fluororubber, silicone rubber, ethylene-propylene rubber, urethane rubber, and the like. Of these, NR, BR, IR, solution-polymerized SBR, emulsion-polymerized SBR, and EPDM are preferably used. Each of these rubbers may be used singly or two or more of these may be used in combination.

The content of the cyclopentene ring-opening polymer in the rubber component to be used in the present invention is preferably 10% by weight or more, more preferably 50% by weight or more, still more preferably 70% by weight or more, with respect to the total rubber component, in view of making the effect of the present invention more profound. In contrast, the content of the rubber other than the cyclopentene ring-opening polymer is preferably 90% by weight or less, more preferably 50% by weight or less, still more preferably 30% by weight or less, with respect to the total rubber component. In the present invention, as the rubber component to be used in the present invention, a component consisting only of the cyclopentene ring-opening polymer (i.e., a component of the cyclopentene ring-opening polymer of 100% by weight) may be used, in view of making the effect of the present invention more profound.

The polymer composition to be used in the present invention is prepared by compounding carbon black to the rubber component containing the cyclopentene ring-opening polymer mentioned above.

Examples of the carbon black include furnace black, acetylene black, thermal black, channel black, graphite, and the like. Of these, furnace black is preferably used, and specific examples thereof include SAF, ISAF, ISAF-HS, ISAF-LS, IISAF-HS, HAF, HAF-HS, HAF-LS, MAF, EEF, and the like. Each of these may be used singly or two or more of these may be used in combination.

The carbon black has a nitrogen adsorption specific surface area ($N_2SA$) of preferably 5 to 200 $m^2/g$, more preferably 20 to 150 $m^2/g$, and has a dibutylphthalate (DBP) adsorption of preferably 5 to 200 ml/100 g, more preferably 50 to 160 ml/100 g. The nitrogen adsorption specific surface area can be measured by the BET method in accordance with ASTM D-4820.

The content of the carbon black in the polymer composition to be used in the present invention is 20 to 200 parts by weight, preferably 25 to 150 parts by weight, more preferably 30 to 100 parts by weight, with respect to 100 parts by weight of the rubber component containing the cyclopentene ring-opening polymer. Setting the content of the carbon black in the range described above can improve the ozone resistance when a crosslinked rubber is obtained to thereby make the crosslinked rubber of the present invention adaptable to applications in which ozone resistance is required. If the content of the carbon black is excessively low, the crosslinked rubber to be obtained will have inferior mechanical physical properties. In contrast, if the content of the carbon black is excessively high, the processability of the polymer composition will be degraded. Also according to the present invention, advantageously, it is also possible to improve the compression set resistance of the crosslinked rubber of the present invention by setting the content of the carbon black in the range described above.

The crosslinked rubber of the present invention, which is produced by crosslinking a polymer composition prepared by compounding carbon black to a rubber component that contains such a cyclopentene ring-opening polymer, shows a rate of change in tensile strength before and after ozone treatment in the range described below when subjected to the ozone treatment under specific conditions.

Specifically, the crosslinked rubber of the present invention shows a rate of change in tensile strength before and after ozone treatment $\Delta S$ (%) within ±70%, preferably within ±60%, more preferably within ±50%, still more preferably within ±44%. The rate of change in tensile strength $\Delta S$ is determined in accordance with the following expression from the tensile strength after ozone treatment $S_1$ (MPa) and the tensile strength before ozone treatment $S_0$ (MPa), which are obtained when the crosslinked rubber is subjected to the ozone treatment in which the rubber is maintained at 40° C. and an ozone concentration of 50 pphm under a 20% tensile strain. The tensile strength before ozone treatment $S_0$ (MPa) and the tensile strength after ozone treatment $S_1$ (MPa) are each measured in a tensile test using a specimen in the shape of the dumbbell No. 1 in accordance with JIS K6251:2010, and then, the rate of change in tensile strength before and after ozone treatment $\Delta S$ can be calculated according to the following expression.

Rate of change in tensile strength before and after ozone treatment $\Delta S$ (%)={tensile strength after ozone treatment $S_1$ (MPa)−tensile strength before ozone treatment $S_0$ (MPa)}/tensile strength before ozone treatment $S_0$ (MPa)}×100

The ozone treatment is preferably performed in accordance with JIS K6259:2004.

In the present invention, a method of setting the rate of change in tensile strength before and after ozone treatment $\Delta S$ in the range described above is not particularly limited. The rate of change $\Delta S$ can be adjusted by a method involving adjusting the amount of carbon black within the range mentioned above with respect to the rubber component containing the cyclopentene ring-opening polymer in the polymer composition and the like. In order to make the absolute value of the rate of change in tensile strength before and after ozone treatment $\Delta S$ smaller and more preferable, it is possible to adjust the rate of change $\Delta S$ by a method involving modifying the cyclopentene ring-opening polymer and the like.

To the polymer composition to be used in the present invention, compounding agents such as a crosslinking agent, crosslinking accelerator, crosslinking activator, antiaging agent, activator, process oil, plasticizer, wax, and filler other than carbon black may be compounded, in addition to the components mentioned above, each in a necessary amount in the conventional manner.

Examples of the crosslinking agent include sulfur, sulfur halide, organic peroxide, quinone dioximes, organic polyvalent amine compounds, zinc acrylates, alkylphenol resins having a methylol group, and the like. Of these, sulfur is preferably used. The amount of the crosslinking agent to be compounded is preferably 0.5 to 5 parts by weight, more preferably 0.7 to 4 parts by weight, still more preferably 1 to 3 parts by weight, with respect to 100 parts by weight of the rubber component in the polymer composition.

Examples of the crosslinking accelerator include sulfenamide-based crosslinking accelerators such as N-cyclohexyl-2-benzothiazolylsulfenamide, N-t-butyl-2-benzothiazolylsulfenamide, N-oxyethylene-2-benzothiazolylsulfenamide, N-oxyethylene-2-benzothiazolylsulfenamide, and N,N'-diisopropyl-2-benzothiazolylsulfenamide; guanidine-based crosslinking accelerator such as 1,3-diphenylguanidine, 1,3-diorthotolylguanidine, and 1-orthotolylbiguanidine; thiourea-based cross-linking accelerators; thiazole-based cross-linking accelerators; thiuram-based cross-linking accelerators; dithiocarbamic acid-based cross-linking accelerators; xanthogenic acid-based cross-linking accelerators; and the like. Of these, those containing a sulfenamide-based cross-linking accelerator are particularly preferable. Each of these cross-linking accelerators may be used singly or two or more of these may be used in combination. The amount of the crosslinking accelerator to be compounded is preferably 0.1 to 15 parts by weight, more preferably 0.5 to 5 parts by weight, with respect to 100 parts by weight of the rubber component in the polymer composition.

Examples of the crosslinking activator include higher fatty acids such as stearic acid, zinc oxide, and the like. The amount of the crosslinking activator to be compounded is not particularly limited. When a higher fatty acid is used as the crosslinking activator, the amount to be compounded is preferably 0.05 to 15 parts by weight, more preferably 0.5 to 5 parts by weight, with respect to 100 parts by weight of the rubber component in the polymer composition. When zinc oxide is used as the crosslinking activator, the amount to be compounded is preferably 0.05 to 15 parts by weight, more preferably 0.5 to 5 parts by weight, with respect to 100 parts by weight of the rubber component in the polymer composition.

As the process oil, a mineral oil or synthetic oil may be used. As the mineral oil, aroma oil, naphthene oil, paraffin oil, and the like are usually used.

Examples of fillers other than carbon black include metal powders such as aluminum powder; inorganic powders such as hard clay, talc, calcium carbonate, titanium oxide, calcium sulfate, calcium carbonate, and aluminum hydroxide; powders such as organic powders, for example, starch and polystyrene powder; short fibers such as glass fibers (milled fibers), carbon fibers, aramid fibers, and potassium titanate whiskers; silica and mica; and the like. Each of these fillers may be used singly or two or more of these may be used in combination.

The method for obtaining the polymer composition to be used in the present invention is not particularly limited, and each of components may be kneaded in accordance with a conventional method. By way of example, the intended composition can be obtained by kneading compounding agents such as carbon black except for the crosslinking agent and crosslinking accelerator with the rubber component such as a cycloolefin ring-opening polymer, and then, mixing the crosslinking agent and crosslinking accelerator into the kneaded material. The temperature for kneading the compounding agents except for the crosslinking agent and crosslinking accelerator with the rubber component is preferably 70 to 200° C., more preferably 100 to 180° C. The kneading time is preferably 30 seconds to 30 minutes. The kneaded material is mixed with the crosslinking agent and crosslinking accelerator after cooling down to usually 100° C. or less, preferably 80° C. or less.

The crosslinked rubber of the present invention can be obtained by crosslinking the polymer composition mentioned above. The crosslinking method is not particularly limited and may be selected depending on the shape, the size, and the like of the crosslinked rubber. Crosslinking may be performed simultaneously with molding by filling a mold with the polymer composition and then heating the mold, or the polymer composition molded in advance may be crosslinked by heating. The crosslinking temperature is preferably 120 to 200° C., more preferably 140 to 180° C. and the crosslinking time is usually 1 to about 120 minutes.

Also, the crosslinked rubber may not be crosslinked enough to the inside thereof although the surface thereof has been crosslinked, depending on the shape, size, and the like thereof. In such a case, the crosslinked rubber may be further heated for secondary crosslinking.

As the heating method, a common method used for crosslinking rubber may be appropriately selected, such as press heating, steam heating, oven heating, and hot air heating.

The crosslinked rubber of the present invention can be suitably used in applications in which ozone resistance is required, because of its excellent ozone resistance. Specifically, the crosslinked rubber may be suitably used in various applications such as: support rubber materials for use in bridges and buildings; seismic-isolation and vibration-proof rubber for use in vehicles for railway, automobile, and the like and various industrial machines; seal materials, such as sealing materials, packing, rubber plugs, and O-rings, for use in various fields such as the air or aerospace field and ship field; fenders for use in the ship field; strength-imparting agents for tackifiers and adhesives; and seal materials for ozone treated water such as packing for ozone treated water.

EXAMPLES

Hereinafter, the present invention will be explained based on more detailed examples, but the present invention is not limited to these examples. In the examples, "parts" are based on weight unless otherwise indicated. The tests and evaluations were performed in accordance with the following methods.

[Molecular Weight of Cyclopentene Ring-Opening Polymer and Butadiene Rubber]

Using a gel permeation chromatography (GPC) system HLC-8220 (manufactured by TOSOH CORPORATION) with two H-type columns HZ-M (made by TOSOH CORPORATION) connected in serial, measurement was performed at a column temperature of 40° C. with tetrahydrofuran as a solvent. As a detector, a differential refractometer RI-8320 (manufactured by TOSOH CORPORATION) was used. The weight average molecular weight (Mw) and number average molecular weight (Mn) of a cyclopentene ring-opening polymer and butadiene rubber were measured as values in terms of polystyrene.

[Glass Transition Temperature (Tg) of Cyclopentene Ring-Opening Polymer]

Measurement was performed using a differential scanning calorimeter (DSC, X-DSC7000 manufactured by Hitachi High-Tech Science Corporation) from −150° C. to +40° C. at a temperature rising rate of 10° C./minute.

[Cis/Trans Ratio of Cyclopentene Ring-Opening Polymer and Vinyl/Cis/Trans Ratio of Butadiene Rubber]

The ratios were determined by $^{13}$C-NMR spectrum measurement.

[Ratio of Introduction of Oxysilyl Group in End-modified Cyclopentene Ring-Opening Polymer]

The ratio of the peak integral value derived from the oxysilyl group and the peak integral value derived from the carbon-carbon double bond in the end-modified cyclopentene ring-opening polymer main chain was determined by use of $^{1}$H-NMR spectroscopy. Based on the ratio of the peak integral values and the measurement value of the number average molecular weight (Mn) measured by GPC, the ratio of introduction of the oxysilyl group [percentage of (number of cyclopentene ring-opening polymer chain ends in which the oxysilyl group was introduced/total number of end-modified cyclopentene ring-opening polymer chains)] was calculated.

[Tensile Test]

A polymer composition as a sample was press-crosslinked at 150° C. for 25 minutes to produce a crosslinked rubber sheet. A dumbbell shaped specimen was obtained by punching the crosslinked rubber sheet to the shape of dumbbell No. 1 in parallel to the grain direction. Then, the dumbbell No. 1 shaped specimen was subjected to a tensile test using a tensile testing machine (product name "TENSOIMETER10K" manufactured by ALPHA TECHNOLOGIES, load cell type, 1 kN) as the tester in accordance with JIS K6251:2010 under conditions of 23° C. and 500 mm/minute to thereby measure the tensile strength.

[Rate of Change in Tensile Strength Before and After Ozone Treatment]

A dumbbell No. 1 shaped specimen was obtained in the same manner as in the tensile test described above. Then, the dumbbell No. 1 shaped specimen was subjected to ozone treatment using an ozone generator (product name "Ozone Weather Meter OMS-HN", manufactured by Suga Test Instruments Co., Ltd.) as a tester, in accordance with JIS K6259:2004, by maintaining the specimen under an environment including 40° C., an ozone concentration of 50 pphm, and a 20% tensile strain for 144 hours. Then, the specimen after the ozone treatment was subjected to a tensile test in the same manner as in the tensile test described above to measure the tensile strength of the specimen after ozone treatment, and the rate of change in tensile strength before and after ozone treatment ΔS was determined from the measurement result obtained according to the following expression. A smaller absolute value of the rate of change in tensile strength before and after ozone treatment ΔS is preferable because it is determined that the variation due to the ozone treatment is smaller and that the specimen has excellent ozone resistance.

Rate of change in tensile strength before and after ozone treatment ΔS (%)={tensile strength after ozone treatment $S_1$ (MPa)−tensile strength before ozone treatment $S_0$ (MPa)}/tensile strength before ozone treatment $S_0$ (MPa)}×100

[Static Ozone Deterioration Test]

A dumbbell No. 1 shaped specimen was obtained in the same manner as in the tensile test described above. Then, the dumbbell No. 1 shaped specimen was subjected to ozone treatment using an ozone generator (product name "Ozone Weather Meter OMS-HN", manufactured by Suga Test Instruments Co., Ltd.) as a tester, in accordance with JIS K6259:2004, by maintaining the specimen under an environment including 40° C., an ozone concentration of 50 pphm, and a 20% tensile strain for a predetermined time (24 hours, 48 hours, 72 hours, 96 hours, and 144 hours), and the cracking state in the specimen was observed to see the size of the crack.

The size of the crack in the specimen was evaluated in accordance with the following criteria.

1. No crack is observed by the naked eye, but a crack can be observed with a magnifier having a magnification of 10×.
2. A crack can be observed by the naked eye.
3. A crack that is deep and relatively large (less than 1 mm).
4. A crack that is deep and large (1 mm or more and less than 3 mm).
5. A specimen has a crack of 3 mm or more or is likely to cut.

[Compression Set]

The polymer composition was press-molded with using a mold while pressure was applied at 150° C. for 30 minutes to obtain a crosslinked rubber cylinder having a diameter of 29 mm and a thickness of 12.5 mm. Then, the crosslinked rubber cylinder obtained was used to measure the compression set in accordance with JIS K6262:2013. Specifically, the distance between two flat faces sandwiching the crosslinked rubber cylinder was compressed by 25% in the disk thickness direction in a Geer's aging oven (product name "AG-1110", manufactured by Ueshima Seisakusho Co., Ltd.) at 100° C. and the crosslinked rubber cylinder was maintained in such a state for 72 hours, followed by carrying out the measurement.

Reference Example 1

Preparation of Diisobutyl Aluminum Mono(n-hexoxide)/Toluene Solution (2.5% by Weight)

Under a nitrogen atmosphere, 88 parts of toluene and 7.8 parts of 25.4% by weight triisobutyl aluminum/n-hexane solution (manufactured by TOSOH FINECHEM CORPORATION) were added to a glass vessel containing a stir bar. Then, the vessel was cooled to −45° C., and 1.02 parts of n-hexanol (the same molar amount as triisobutyl aluminum) were slowly added dropwise thereto under vigorous stirring. Subsequently, the mixture was left under stirring until it reached room temperature to prepare a diisobutyl aluminum mono(n-hexoxide)/toluene solution (2.5% by weight).

Synthesis Example 1

Under a nitrogen atmosphere, 87 parts of a 1.0% by weight $WCl_6$/toluene solution and 43 parts of a 2.5% by weight diisobutyl aluminum mono(n-hexoxide)/toluene solution prepared in Reference example 1 were added to a glass vessel containing a stir bar and stirred for 15 minutes to obtain a catalyst solution. Then, under a nitrogen atmosphere, 300 parts of cyclopentene and 1.24 parts of 1,4-bis(triethoxysilyl)-2-butene were added to a pressure resistant glass reaction vessel equipped with a stirrer. Then, 130 parts of the catalyst solution prepared above was added thereto, and polymerization reaction was performed at 25° C. for 4 hours. After 4 hours of the polymerization reaction, an excess amount of ethyl alcohol was added to the pressure resistant glass reaction vessel to terminate the polymerization reaction, and then, as an antiaging agent, 0.2 parts of Irganox 1520L (manufactured by Ciba Specialty Chemicals Inc.) was added with respect to 100 parts of the polymer obtained by the polymerization. Then, the polymer was solidified with a large amount of ethanol and collected, and dried under vacuum at 40° C. for 3 days to thereby obtain 78 part of the both end-modified cyclopentene ring-opening polymer in which triethoxysilyl has been introduced to both the ends (a1). The both end-modified cyclopentene ring-opening polymer (a1) obtained had a weight average molecular weight (Mw) of 366,000, a glass transition temperature (Tg) of −106° C., a cis/trans ratio of cis/trans=55/45, and a ratio of introduction of the oxysilyl group of 143%.

Synthesis Example 2

Under a nitrogen atmosphere, 87 parts of a 1.0% by weight $WCl_6$/toluene solution and 43 parts of a 2.5% by weight diisobutyl aluminum mono(n-hexoxide)/toluene solution prepared in Reference example 1 were added to a glass vessel containing a stir bar and stirred for 15 minutes to obtain a catalyst solution. Then, under a nitrogen atmosphere, 300 parts of cyclopentene and 0.26 parts of 1-hexene were added to a pressure resistant glass reaction vessel equipped with a stirrer. Then, 130 parts of the catalyst solution prepared above was added thereto, and polymerization reaction was performed at 0° C. for 4 hours. After 4 hours of the polymerization reaction, an excess amount of ethyl alcohol was added to the pressure resistant glass reaction vessel to terminate the polymerization reaction, and then, as an antiaging agent, 0.2 parts of Irganox 1520L (manufactured by Ciba Specialty Chemicals Inc.) was added with respect to 100 parts of the polymer obtained by the polymerization. Then, the polymer was solidified with a large amount of ethanol and collected. The polymer collected was dried under vacuum at 40° C. for 3 days to thereby obtain 74 parts of an unmodified cyclopentene ring-opening polymer (a2). The unmodified cyclopentene ring-opening polymer (a2) obtained had a weight average molecular weight (Mw) of 389,000, a glass transition temperature (Tg) of −110° C., and a cis/trans ratio of cis/trans=81/19.

Synthesis Example 3

Under a nitrogen atmosphere, 1000 parts of cyclopentene, 0.42 parts of 1-hexene, and 990 parts of toluene were added to a pressure resistant glass reaction vessel containing a magnetic stir bar. Subsequently, 0.068 parts of (3-phenyl-1H-inden-1-ylidene)bis(tricyclohexylphosphine)ruthenium dichloride dissolved in 10 parts of toluene were added thereto, and the mixture was polymerized at room temperature for 3 hours. After 3 hours of the polymerization reaction, an excess amount of ethyl vinyl ether was added to the pressure resistant glass reaction vessel to terminate the polymerization reaction, and then, as an antiaging agent, 0.2 parts of Irganox 1520L (manufactured by Ciba Specialty Chemicals Inc.) was added with respect to 100 parts of the polymer obtained by the polymerization. Then, the polymer was solidified with a large amount of ethanol and collected. The polymer collected was dried under vacuum at 50° C. for 24 hours to thereby obtain 650 parts of an unmodified cyclopentene ring-opening polymer (a3). The unmodified cyclopentene ring-opening polymer (a3) obtained had a weight average molecular weight (Mw) of 434,000, a glass transition temperature (Tg) of −98° C., and a cis/trans ratio of cis/trans=17/83.

Synthesis Example 4

After 5670 g of cyclohexane and 700 g of 1,3-butadiene were placed under a nitrogen atmosphere in an autoclave equipped with a stirrer, n-butyl lithium was added thereto in an amount necessary to counteract the impurities inhibiting the polymerization contained in cyclohexane and 1,3-butadiene. Additionally, 8.33 mmol of n-butyl lithium, which was used for the polymerization reaction, was added thereto, and the polymerization was allowed to start at 50° C. After 20 minutes elapsed from the start of the polymerization, 300 g of 1,3-butadiene was continuously added over 30 minutes. The maximum temperature during the polymerization reaction was 80° C.

After the continuous addition was finished, the polymerization reaction was further continued for 15 minutes. After confirmation that the polymerization conversion rate reached the range of 95% to 100%, 0.333 mmol of 1,6-bis(trichlorosilyl)hexane (corresponding to 0.04 times by mole of n-butyl lithium used in the polymerization) in the form of a 40% by weight solution in cyclohexane was added to the polymerization solution and the mixture was allowed to react for 30 minutes. Furthermore, 2.92 mmol of polyorganosiloxane represented by the following formula (3) (corresponding to 0.35 times by mole of n-butyl lithium used in the polymerization) in the form of a 20% by weight solution in xylene was then added, and the mixture was allowed to react for 30 minutes. Then, 8.33 mmol of tetramethoxysilane (corresponding to one time by mole n-butyl lithium used in the polymerization) in the form of a 25% by weight solution in cyclohexane was added thereto, and the mixture obtained was allowed to react for 30 minutes. Thereafter, as a polymerization terminator, methanol in an amount corresponding to 2 times by mole of n-butyl lithium used to thereby obtain a solution containing end-modified polybutadiene (a4). Then, as an antiaging agent, 0.2 parts of Irganox 1520L (manufactured by Ciba Specialty Chemicals Inc.) was added to the solution obtained, per 100 parts of the rubber component. After the solvent was removed by steam stripping, the residue was dried under vacuum at 60° C. for 24 hours thereby to obtain end-modified butadiene rubber (a4). The end-modified butadiene rubber (a4) had a weight average molecular weight (Mw) of 553,000 and a vinyl/cis/trans ratio of vinyl/cis/trans=10/45/45.

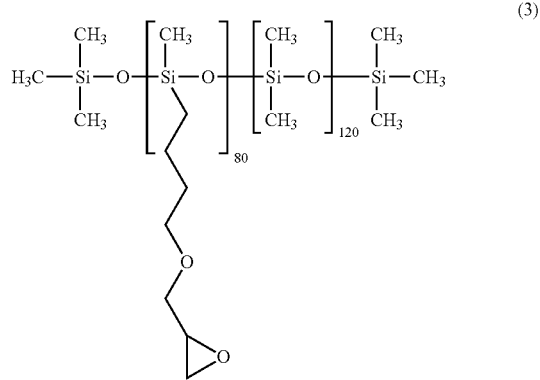

Example 1

In a Banbury type mixer, 100 parts of the both end-modified cyclopentene ring-opening polymer (a1) obtained in Synthesis Example 1 was masticated for 30 seconds, and then, 2 parts of stearic acid, 3 parts of zinc oxide, 60 parts of carbon black (product name "IRB#8", manufactured by Continental Carbon Company, nitrogen adsorption specific surface area (BET method): 76.3 m²/g, furnace black), and 15 parts of a process oil (manufactured by JX Nippon Oil & Energy Corporation, product name "Aromax T-DAE") were added thereto. After the mixture was kneaded at 110° C. for 180 seconds, the compounding agents remaining on the top of the ram were cleaned, the mixture was kneaded for further 150 seconds, and then, the kneaded material was discharged from the mixer. Then, after the kneaded material was cooled to room temperature, the kneaded material obtained, 1.5 parts of sulfur, and 0.9 parts of N-(tert-butyl)-2-benzothiazolylsulfenamide (manufactured by OUCHI SHINKO CHEMICAL INDUSTRIAL CO., LTD., product name "Nocceler NS-P") as a crosslinking accelerator were kneaded in an open roll at 23° C. to obtain a polymer composition in the form of a sheet.

Then, the polymer composition obtained was used to obtain a crosslinked rubber in accordance with the method described above, and a tensile test, measurement of rate of change in tensile strength before and after ozone treatment, static ozone deterioration test, and measurement of compression set were performed. The results are shown in Table 1.

Example 2

A polymer composition was obtained in the same manner as in Example 1 except that 100 parts of the both end-modified cyclopentene ring-opening polymer (a1) obtained in Synthesis Example 1 was replaced by the 100 parts of the unmodified cyclopentene ring-opening polymer (a2) obtained in Synthesis Example 2, and the evaluation was performed in the same manner. The results are shown in Table 1.

Example 3

A polymer composition was obtained in the same manner as in Example 1 except that 100 parts of the both end-modified cyclopentene ring-opening polymer (a1) obtained in Synthesis Example 1 was replaced by 100 parts of the unmodified cyclopentene ring-opening polymer (a3) obtained in Synthesis Example 3, and the evaluation was performed in the same manner. The results are shown in Table 1.

Comparative Example 1

A polymer composition was obtained in the same manner as in Example 1 except that 100 parts of the both end-modified cyclopentene ring-opening polymer (a1) obtained in Synthesis Example 1 was replaced by 100 parts of an unmodified butadiene rubber (product name "Nipol BR1220" manufactured by Nippon Zeon Co., Ltd., cis content: 97% or more) and the evaluation was performed in the same manner. The results are shown in Table 1.

Comparative Example 2

A polymer composition was obtained in the same manner as in Example 1 except that 100 parts of the both end-modified cyclopentene ring-opening polymer (a1) obtained in Synthesis Example 1 was replaced by 100 parts of the end-modified butadiene rubber (a4) obtained in Synthesis Example 4, and the evaluation was performed in the same manner. The results are shown in Table 1.

TABLE 1

|  |  | Example | | | Comparative Example | |
| --- | --- | --- | --- | --- | --- | --- |
|  |  | 1 | 2 | 3 | 1 | 2 |
| Formulation | | | | | | |
| Both end-modified cyclopentene ring-opening polymer (a1) (Cis/trans = 55/45) | (parts) | 100 | — | — | — | — |
| Unmodified cyclopentene ring-opening polymer (a2) (Cis/trans = 81/19) | (parts) | — | 100 | — | — | — |
| Unmodified cyclopentene ring-opening polymer (a3) (Cis/trans = 17/83) | (parts) | — | — | 100 | — | — |
| Unmodified butadiene rubber | (parts) | — | — | — | 100 | — |
| End-modified butadiene rubber(a4) | (parts) | — | — | — | — | 100 |
| Stearic acid | (parts) | 2 | 2 | 2 | 2 | 2 |
| Zinc oxide | (parts) | 3 | 3 | 3 | 3 | 3 |
| Carbon black | (parts) | 60 | 60 | 60 | 60 | 60 |
| Sulfur | (parts) | 1.5 | 1.5 | 1.5 | 1.5 | 1.5 |
| Crosslinking accelerator | (parts) | 0.9 | 0.9 | 0.9 | 0.9 | 0.9 |
| Process oil | (parts) | 15 | 15 | 15 | 15 | 15 |
| Evaluation results | | | | | | |
| Tensile strength | (MPa) | 12.4 | 10.2 | 19.1 | 16 | 15.2 |
| Rate of change in tensile strength before and after ozone treatment ΔS | (%) | −40 | −45 | −45 | −92 | −75 |
| Static ozone deterioration test, after 24 hours | | 1 | 1 | 1 | 3 | 3 |
| Static ozone deterioration test, after 48 hours | | 2 | 2 | 2 | 4 | 4 |
| Static ozone deterioration test, after 72 hours | | 2 | 2 | 2 | 5 | 5 |
| Static ozone deterioration test, after 96 hours | | 2 | 2 | 2 | 5 | 5 |
| Static ozone deterioration test, after 144 hours | | 2 | 2 | 2 | 5 | 5 |
| Compression set | (%) | 49 | 45 | 46 | 53 | 59 |

As clear from the results of Examples 1 to 3 shown in Table 1, the predetermined crosslinked rubber of the present invention produced by crosslinking a polymer composition containing a cyclopentene ring-opening polymer and a predetermined amount of carbon black showed a less absolute value of the rate of change in tensile strength before and after ozone treatment ΔS, and additionally had suppressed static ozone deterioration, being excellent in ozone resistance, in comparison with those in the case where the cyclopentene ring-opening polymer was replaced by a butadiene rubber (Comparative Examples 1 and 2). Also as clear from the results of Examples 1 to 3, the predetermined crosslinked rubber of the present invention produced by crosslinking a polymer composition containing a cyclopentene ring-opening polymer and a predetermined amount of carbon black had a low compression set and was thus excellent in compression set resistance.

The invention claimed is:

1. A crosslinked rubber produced by crosslinking a polymer composition comprising 100 parts by weight of a rubber component comprising a cyclopentene ring-opening polymer and 20 to 200 parts by weight of carbon black,
    wherein the cyclopentene ring-opening polymer has a molecular structure consisting only of carbon atoms and hydrogen atoms,
    wherein the rubber component:
        consists only of the cyclopentene ring-opening polymer, or
        consists of 70% by weight or more of the cyclopentene ring-opening polymer with respect to 100% by weight of the total rubber component and a rubber other than the cyclopentene ring-opening polymer, the rubber other than the cyclopentene ring-opening polymer being at least one selected from the group consisting of natural rubber (NR), polyisoprene rubber (IR), low-cis BR (polybutadiene rubber), high-cis BR, high-trans BR (a trans-bond content in the butadiene moiety is 70 to 95%), styrene-isoprene copolymer rubber, butadiene-isoprene copolymer rubber, ethylene-propylene-diene rubber (EPDM), emulsion-polymerized styrene-acrylonitrile-butadiene copolymer rubber, acrylonitrile-butadiene copolymer rubber, polyisoprene-SBR block copolymer rubber, polystyrene-polybutadiene-polystyrene block copolymer, acrylic rubber, epichlorohydrin rubber, fluororubber, silicone rubber, ethylene-propylene rubber, and urethane rubber, and
    wherein, when the crosslinked rubber is subjected to an ozone treatment in which the rubber is maintained at 40° C. and an ozone concentration of 50 pphm for 144 hours under a 20% tensile strain, the crosslinked rubber shows a rate of change in tensile strength before and after ozone treatment of within ±70%.

2. The crosslinked rubber according to claim 1, wherein the proportion of a repeat unit formed by ring-opening polymerizing cyclopentene in the cyclopentene ring-opening polymer is 80 mol % or more with respect to the total repeat units.

3. The crosslinked rubber according to claim 1, wherein the carbon black is furnace black.

* * * * *